United States Patent [19]

Frisch

[11] Patent Number: 5,048,224
[45] Date of Patent: Sep. 17, 1991

[54] INSECT TRAP

[75] Inventor: Steven Frisch, Brooklyn, N.Y.

[73] Assignee: Atlantic Paste & Glue Co., Inc., Brooklyn, N.Y.

[21] Appl. No.: 522,265

[22] Filed: May 11, 1990

[51] Int. Cl.$^5$ .............................................. A01M 1/14
[52] U.S. Cl. ...................................... 43/114; 43/107; 43/132.1
[58] Field of Search ................. 43/114, 113, 107, 121, 43/122, 132.1

[56] References Cited

U.S. PATENT DOCUMENTS

| | | | |
|---|---|---|---|
| 3,708,908 | 1/1973 | Levey | 43/114 |
| 4,411,093 | 10/1983 | Stout et al. | 43/114 |
| 4,577,434 | 3/1986 | Davis | 43/114 |
| 4,671,010 | 6/1987 | Conlee et al. | 43/114 |
| 4,802,303 | 2/1989 | Floyd, III | 43/114 |

FOREIGN PATENT DOCUMENTS

| | | | |
|---|---|---|---|
| 7512121 | 4/1977 | Netherlands | 43/114 |
| 2144020 | 2/1985 | United Kingdom | 43/114 |

Primary Examiner—Richard K. Seidel
Assistant Examiner—Chuck Y. Mah
Attorney, Agent, or Firm—Bernard Malina

[57] ABSTRACT

An insect trap includes a vertically mounted member, the outer surface of which is coated with a non-drying adhesive layer. The ends of the tubular member are mounted in end caps which serve to position the tubular member in a container and also to catch and retain insects which have been killed by the trap. The container includes perforated panels which may be selectively removed by a user to expose the tubular member to insects while shielding it from view.

33 Claims, 4 Drawing Sheets

INSECT TRAP

BACKGROUND OF THE INVENTION

The prior art related to the trapping of flies and other types of insects includes numerous methods and devices, the most common of which is the widely used adhesive coated sheets or strips commonly known as flypaper.

Another type of adhesive trap is shown in U.S. Pat. No. 4,490,938. In this device, a tube is coated with an adhesive layer and is mounted in an elongated plastic body member.

Both the flypaper type of trap and the device shown in U.S. Pat. No. 4,490,938 are subject to the deficiency of providing continual visual access to the adhesive portion and the unattractive view of flies which have been caught in these traps.

This drawback tends to limit the application of these traps to locations where they cannot be seen, and thus generally reduces their effectiveness.

OBJECTS OF THE INVENTION

It is an object of the present invention to provide an insect trap which incorporates an adhesive surface which can be shielded from view.

Another object of the present invention is to provide an insect trap which is adapted for hanging in corner locations as well as along vertical walls.

Another object of the present invention is to provide an adhesives type insect trap which can be mounted either vertically or horizontally.

Another object of the present invention is to provide an adhesive type insect trap which incorporates a chemical insect attractant.

Another object of the present invention is to provide an adhesive type insect trap which is capable of retaining flies which have been killed by the trap, but which fail to adhere to the adhesive layer contained therein.

Still another object of the present invention is to provide an insect trap which is composed of a relatively small number of component parts, each of which is economical to manufacture in large volume, resulting in a low overall cost.

SUMMARY OF THE INVENTION

In accordance with the present invention, there is provided an insect trap which includes an elongated member, the outer surface of which is coated with an adhesive layer. The ends of the tubular member are attached to cup members, each of which has a central projecting portion which projects into an end of the tube. The tube and the cup members fit within a cardboard body portion which includes pre-scored panels. The pre-scored panels may be selectively removed by a user in order to allow flies to enter the fly trap while retaining selected panels to shield the tubular member from view by persons in the vicinity of the insect trap. The invention also includes a packet of powdered chemical insect attractant which may be applied onto the adhesive layer prior to the first use of the insect trap.

BRIEF DESCRIPTION OF THE DRAWINGS

Additional objects and advantages of the present invention may best be understood by reference to the following description taken in conjunction with the accompanying drawings in which.

DETAILED DESCRIPTION OF THE INVENTION

Figure 1:
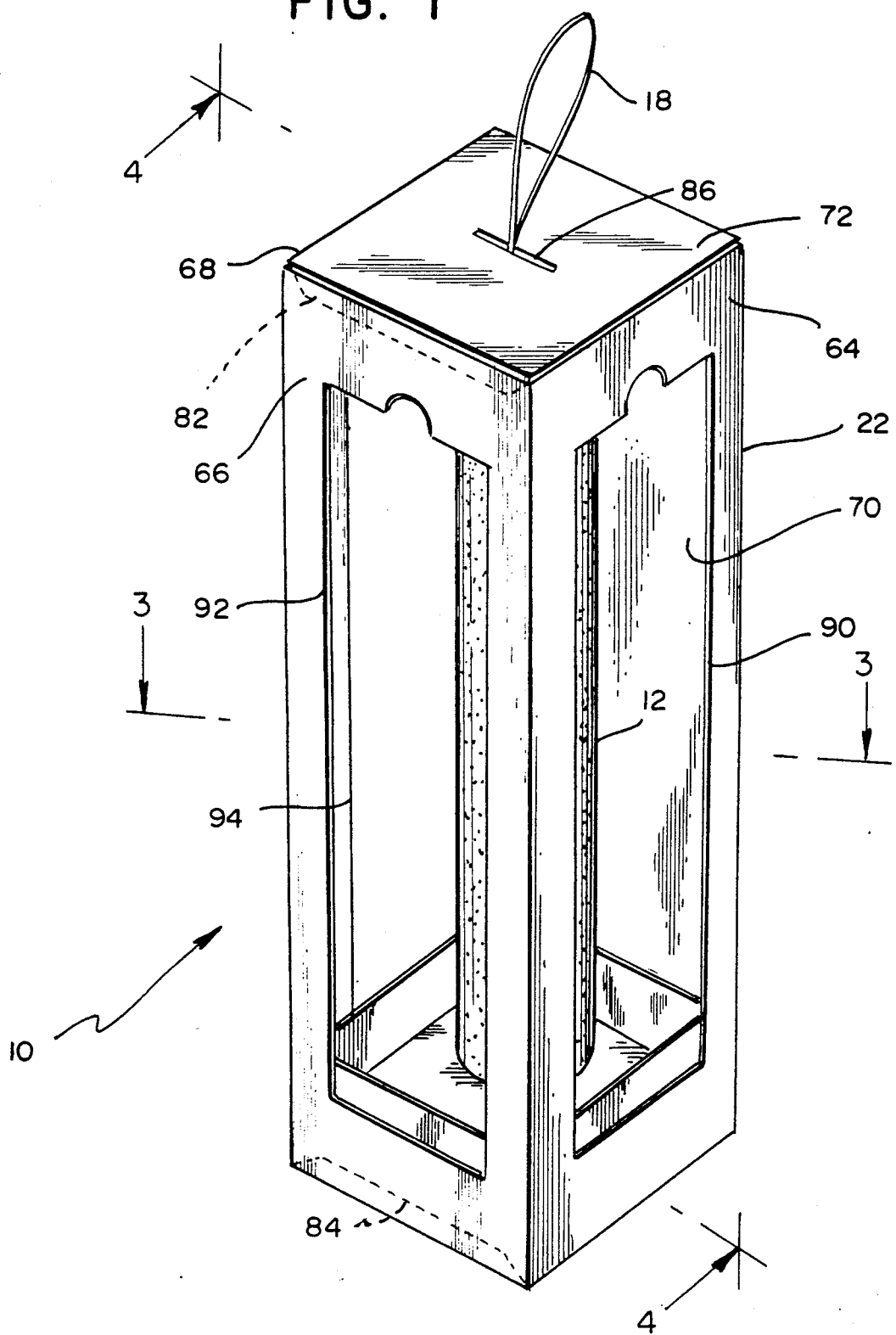
FIG. 1 is an overall perspective view of an insect trap made in accordance with the present invention.
Figure 2:
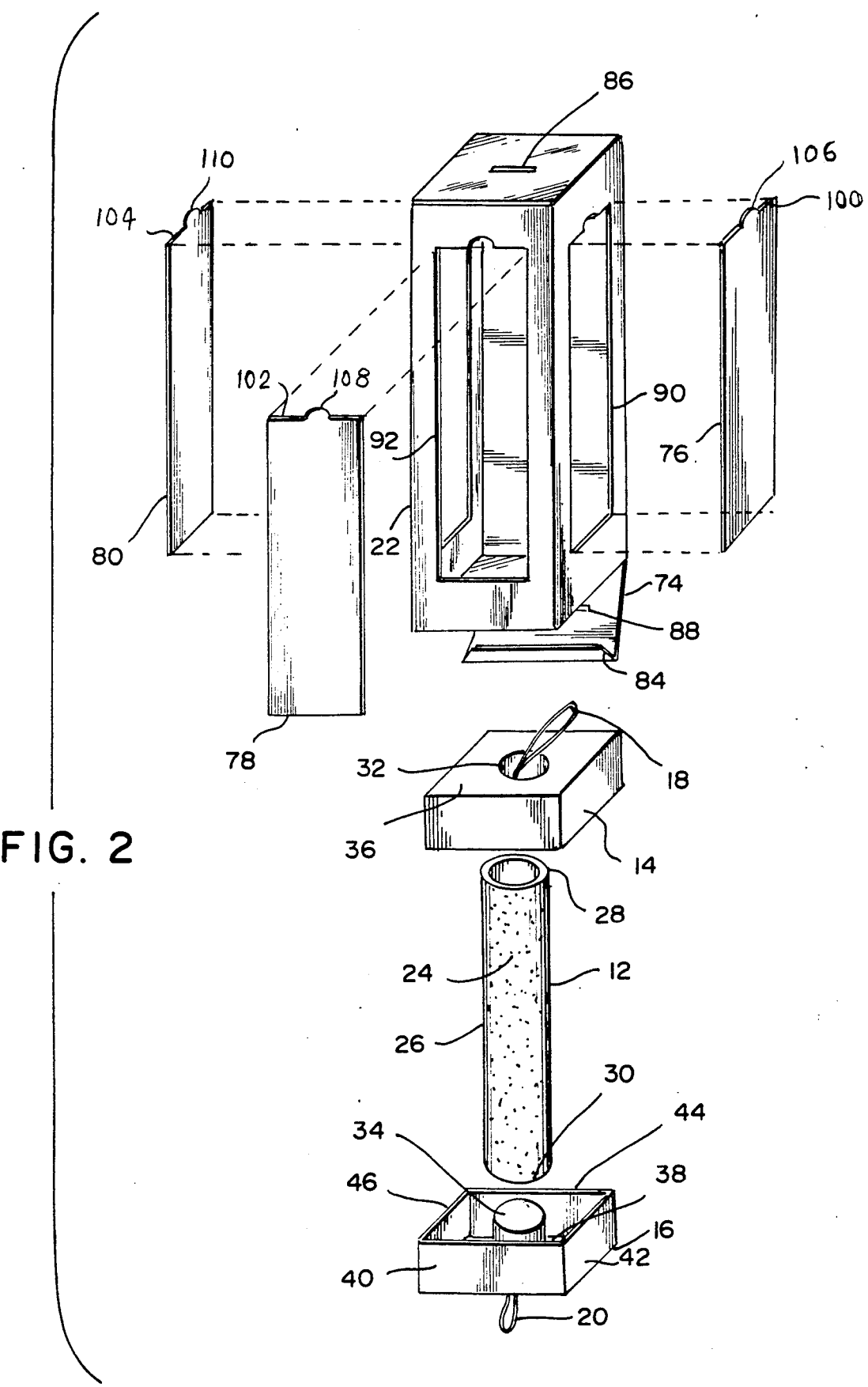
FIG. 2 is an exploded perspective view of the insect trap of FIG. 1;.

With reference to the drawings, there is shown in FIGS. 1 and 2 an insect trap made in accordance with the present invention, generally indicated by the reference numeral 10, and including an elongated member 12, at least one and preferably a pair of end cap members 14, 16, a container 22, and hanger members 18, 20.

The elongated member 12 may preferably be tubular and made of cardboard or similar material and includes a non-drying adhesive layer 24 deposited on its outer surface 26. The tube 12 in one embodiment is generally cylindrical in shape and in cross-section may be any cross-sectional shape, e.g. circular or rectangular. The ends 28, 30 of the tube 12 are each mounted on an end cap member 14, 16.

The end cap members 14, 16 each have a central projecting portion 32, 34 which fits snugly into the ends 28, 30 of the tube member 12. The end cap members 14, 16 each include a flat portion 36, 38 which projects outwardly from the central projecting portions 32, 34 and a flange portion 40, 42, 44, 46 which projects in a generally perpendicular direction from the outer edges 48, 50, 52, 54 of the flange portions 40, 42. The flat portions 36, 38 and the flange portions 40, 42, 44, 46 are proportioned to fit within the container with the flange portions 40, 42, 44, 46 closely abutting the inner surfaces 56, 58, 60, 62 of the container 22. The end cap members may be preferably made of a moldable or vacuous formable plastic material.

The container 22 is formed of four wall panels 64, 66, 68, 70, a top panel 72 and a bottom panel 74. Each of the wall panels 64, 66, 68 has a perforated panel portion 76, 78, 80. The perforated panel portions 76, 78, 80 are frangible and the panel 76, 78, 80 portions may be pushed out and removed by a user, as will be presently described, thereby leaving openings 90, 92, 94 in the wall panels 64, 66, 68. The perforated panel portions 76, 78, 80 on the wall panels 64, 66, 68 are generally rectangular and are shaped similar to the wall panels 64, 66, 68.

The top edges 100, 102, 104 of the perforated panel portions 76, 78, 80 each have a tab portion 106, 108, 110 which facilitates grasping and removing the panels 76, 78, 80.

The four wall panels 64, 66, 68, 70, the top panel 72 and the bottom panel 74 may be colored or otherwise finished in a decorative manner. Descriptive text concerning operation of the insect trap 10 may be preferably restricted to the surfaces of the perforated panel portions 76, 78, 80 so that once these panel portions 76, 78, 80 are removed, only the decorative finish on the wall panels 64, 66, 68, 70 and the top and bottom panels 72, 74 remain in view.

The top 73 and bottom panels 74 each have a flap portion 82, 84 which is inserted behind the wall panel 66, as is shown in FIG. 1. The top and bottom panels 72, 74 also each have a slit 86, 88 through which the hanger members 18, 20 may be passed. Hanger members may take any suitable form for suspending trap 10 such as string loops as shown, JK-hooks (not shown), or other sutable suspension means.

Figure 3:
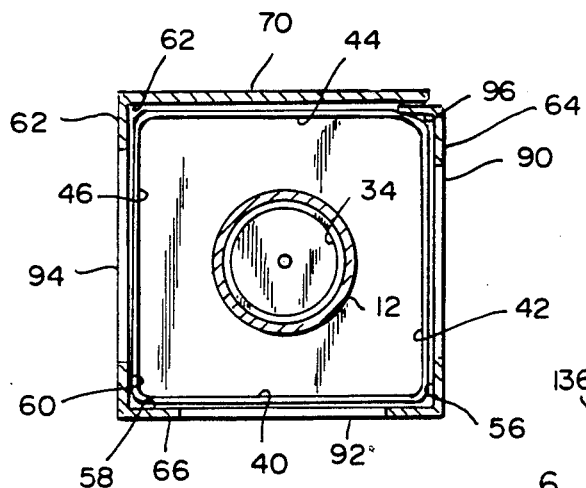
FIG. 3 is a cross-sectional view taken along the line 3—3 of FIG. 1.

The wall panel 64 has a flap 96 which is glued to the wall panel 70, as is shown in FIG. 3.

During use, a user first passes the hanger member 18 through the slit 86. One or more of the perforated panels 76, 78, 80 are then removed in order to expose the adhesive layer 24. For example, if the insect trap 10 is to be hung in a corner of a room, the perforated panels 76, 78 are removed and the insect trap 10 is hung so that the openings 90, 92 in the wall panels 64, 66 formed by the removal of these perforated panels face the walls forming the corner of the room. This allows the wall panels 68, 70 to face the room and shield the adhesive layer 24 from view.

Alternatively, if the insect trap 10 is to be mounted on the wall of a room, the perforated panels 76, 80 may be removed, leaving the wall panel 66 to face the room and shield the adhesive layer 24 from view.

The effectiveness of the insect trap 10 may be increased by applying a powdered chemical insect attractant which is provided in the packet 112 which is stored under the panel 74. The insect attractant is one of a class of compounds known as pheromones which are believed to act as an insect sex attractant. To apply the attractant, the bottom panel 74 is opened and the tube 12 and end cap 14, 16 members are removed from the container 22, as is shown in FIG. 2. The packet 112 which is made of paper, is opened and the powdered chemical insect attractant is dusted onto the adhesive layer 24. The tube 12 and end cap members 14, 16 are reinstalled into the container and the insect trap is hung in an appropriate location.

The provision of two hanger members 18, 20 allow the insect trap to be hung in a vertical or alternatively in a horizontal orientation.

The insect trap 10 may be used both outdoors or indoors. In outdoor and other applications where it is not necessary to shield the tube 12 from view, the insect trap 10 may be used without the container 22.

Figure 5:
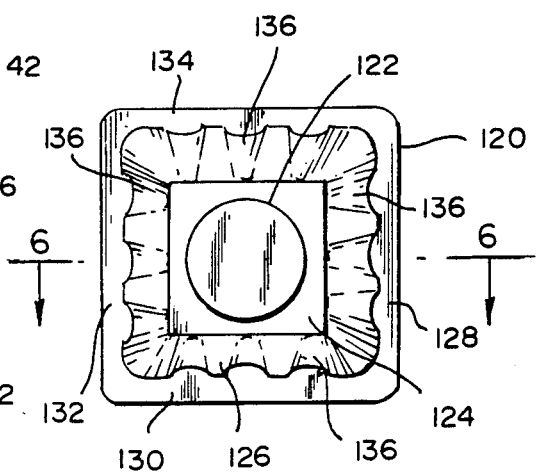
FIG. 5 is a top view of an alternative end cap for use with the insect trap of FIG. 1.
Figure 4:
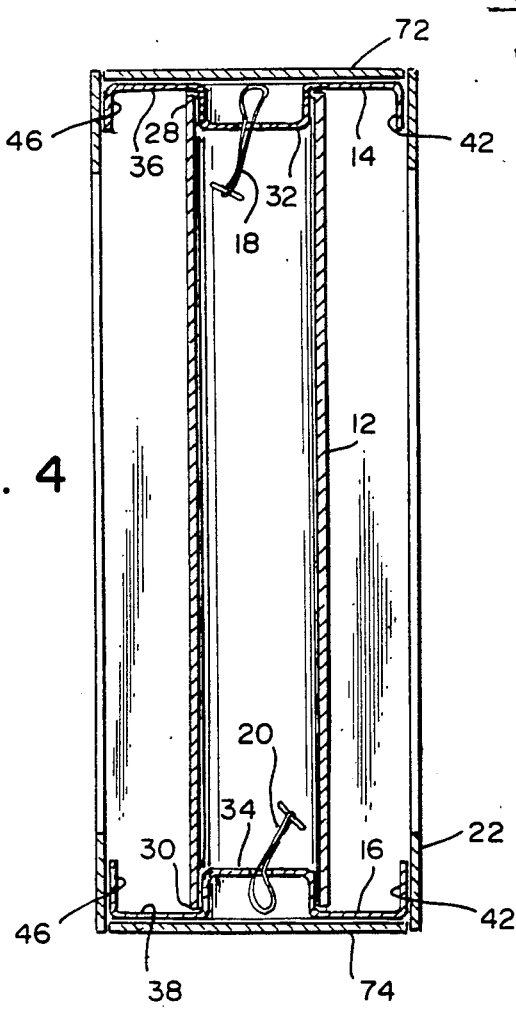
FIG. 4 is a cross-sectional view taken along the line 4—4 of FIG. 1.
Figure 6:
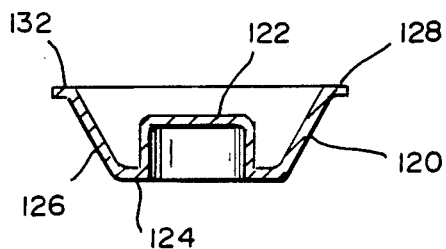
FIG. 6 is a cross-sectional view of the alternative end cap of FIG. 5.

In an alternative embodiment of the invention, the end cap members 14, 16 which have been shown and described above may be replaced with a pair of end cap members, each of which is identical to the end cap member 120 which is shown in FIGS. 5 and 6.

The end cap member 120 includes a central projecting portion 122 which is similar to the projecting portions 32, 34 of the end cap members 14, 16 and which fits snugly into the ends 28, 30 of the tube member 12.

The end cap 120 includes a flat portion 124 which projects outwardly from the central projecting portion, an outwardly flaring portion 126 and four rim portions 128, 130, 132, 134. The rim portions 128, 130, 132, 134 are proportioned to closely abut the inner surfaces 56, 58, 60, 62 of the container 22. A hanger member which is similar to the hanger member 18, and which is not illustrated, is mounted on the central projecting portion 122 in the manner previously described. The outwardly flaring portions include a plurality of fluted portions 136.

Figure 7:
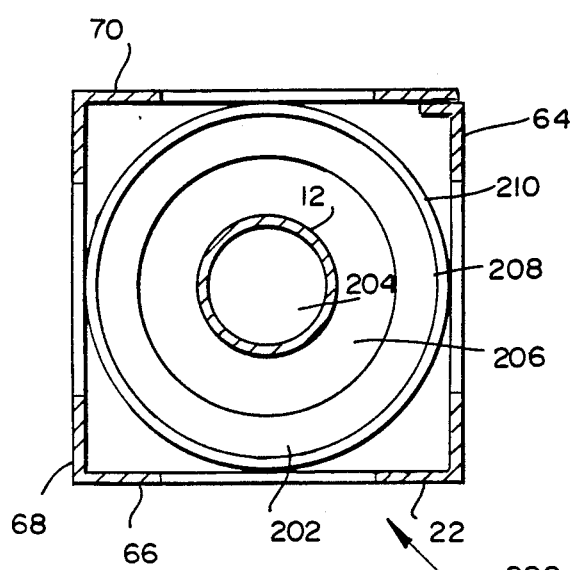
FIG. 7 is a cross-sectional view taken along the line 3—3 of FIG. 1 showing another alternative end cap for use with the insect trap of FIG. 1.
Figure 8:
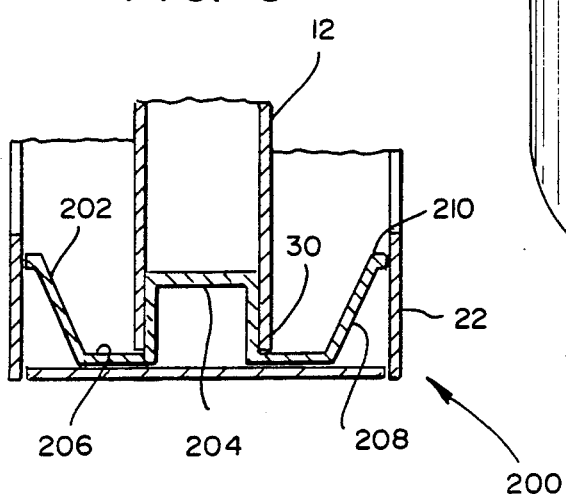
FIG. 8 is a fragmentary cross-sectional view taken along the line 4—4 of FIG. 1 showing the use of the alternative end cap of FIG. 7.

In another alternative embodiment of the invention 200 which is shown in FIGS. 7 and 8, the end caps 14, 16 are replaced by a pair of end caps which are circular in configuration. One of these circular end caps 202 is shown in FIGS. 7 and 8 and includes a central projecting portion 204 which fits snugly into the ends 28, 30 of the tube member 12 in the manner previously described. The end cap 202 includes a flat portion 206 which projects outwardly from the central projecting portion 204, an outwardly flaring flange portion 208, and a rim portion 210. The rim portion 210 abuts the inner surfaces 56, 58, 60 and 62 of the container 22, as is shown in FIG. 7.

Figure 9:
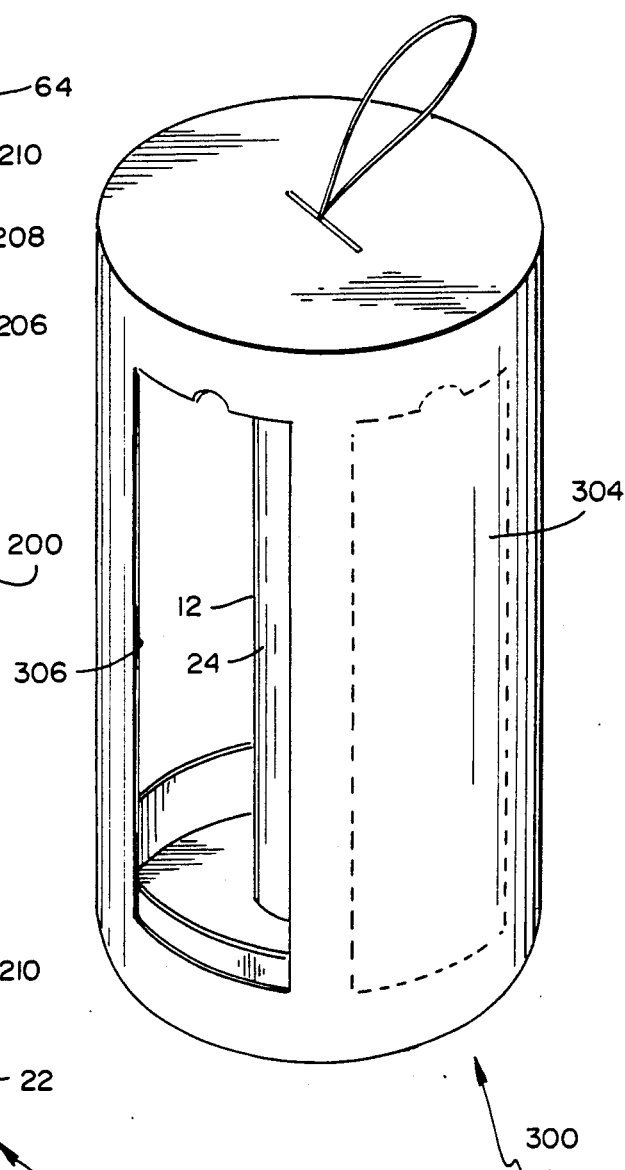
FIG. 9 is an overall perspective view of an alternative ewbodiment of the invention which incorporates a cylindrical carton and the end cap of FIG. 7.

In still another embodiment 300 of the invention, the container 22 is replaced by a cylindrical container 302 shown in FIG. 9 which contains the tube 12 and a pair of end caps which are circular in configuration and are similar to the end cap 202 shown and described above in connection with FIGS. 7 and 8.

The container 302 includes one or more perforated panel portions 304, 306, all of which may be removed to expose the tube 12 and the adhesive layer 24. Alternatively, selected perforated panels may be removed to shield a portion of the tube 12 from view.

While preferred embodiments of the invention have been shown and described herein, it is obvious that numerous changes and omissions may be made in such embodiments without departing from the spirit and scope of the invention.

What is claimed is:

1. An insect trap comprising
   an elongated member having a first end, a second end and an outer surface,
   a non-drying adhesive layer disposed on said outer surface,
   at least one end cap mounted on one end of said elongated member,
   a container enclosing said elongated member and said end cap, with said container comprising a plurality of panel portions, and with at least one of said panel portions comprising a removable perforated portion.

2. An insect trap according to claim 1 comprising a pair of end caps mounted, one each on said ends of said elongated member.

3. An insect trap according to claim 2 further comprising hanger means attached to at least one of said end caps.

4. An insect trap according to claim 3 comprising a pair of hanger means attached, one each, to said end caps.

5. An insect trap according to claim 3 in which said hanger means comprises a flexible loop.

6. An insect trap according to claim 2 in which end caps each include central portions and flange portions, with said central portions disposed projecting into said ends of said elongated member.

7. An insect trap according to claim 6 with said flange portions of said end caps disposed abutting said panel portions.

8. An insect trap according to claim 7 in which said end caps each have a concave portion and with said concave portions of said end caps disposed in a mutually facing relationship.

9. An insect trap according to claim 1 in which said panel portions comprise generally rectangular side panels and generally square top and bottom panels.

10. An insect trap according to claim 1 in which said elongated member comprises a tube member.

11. An insect trap according to claim 10 in which said tube member is made of cardboard.

12. An insect trap according to claim 1 in which said panel portions are made of cardboard.

13. An insect trap according to claim 1 in which said end caps are each made of plastic.

14. An insect trap according to claim 1 comprising at least two of said panel portions, each of which comprises a removable panel portion.

15. An insect trap according to claim 1 comprising at least three of said panel portions, each of which comprises a removable panel portion.

16. An insect trap according to claim 1 further comprising a chemical insect attractant layer deposited on said non-drying adhesive layer.

17. An insect trap according to claim 16 in which said chemical insect attractant layer comprises a pheromone.

18. An insect trap comprising
an elongated member having a first end, a second end, and an outer surface,
a non-drying adhesive layer disposed on said outer surface,
a pair of end caps mounted, one each, on said ends of said elongated member,
a cylindrical container enclosing said elongated member and said end caps with said container comprising a cylindrical wall portion and with said wall portion comprising at least one removable panel portion.

19. An insect trap according to claim 18 in which said elongated member is tubular.

20. An insect trap according to claim 18 in which said cylindrical wall portion further comprises a plurality of removable panel portions.

21. An insect trap comprising
an elongated member having a first end, a second end and an outer surface,
a non-drying adhesive layer disposed on said outer surface,
end cap means on said elongated member in proximity to the lower end of said elongated member,
container means enclosing said elongated member and said end cap means with said container means comprising at least one panel portion, said panel portion comprising a removable portion.

22. An insect trap according to claim 21 in which said elongated member has a round cross-section perpendicular to its longitudinal axis.

23. An insect trap according to claim 22 in which said cross-section is circular.

24. An insect trap according to claim 21 with said container comprising a plurality of panel portions.

25. An insect trap according to claim 21 in which said panel portions comprise generally rectangular side, top and bottom panels.

26. An insect trap according to claim 21 in which said elongated member comprises a tube member.

27. An insect trap according to claim 21 in which at least one of said panel portions comprises a removable portion.

28. An insect trap according to claim 21 comprising at least two of said removable panel portions.

29. An insect trap according to claim 21 in which said end cap means comprises an end cap mounted on the lower end of said elongated member.

30. An insect trap comprising
an elongated member having a first end, a second end, and an outer surface,
a non-drying adhesive layer disposed on said outer surface,
end cap means mounted on said elongated member in proximity to one end of said elongated member,
a cylindrical container enclosing said elongated member and said end cap means with said container comprising a cylindrical wall portion and with said wall portion comprising at least one removable panel portion.

31. An insect trap according to claim 30 in which said elongated member is circular in cross-section perpendicular to the axis of said elongated member.

32. An insect trap according to claim 30 in which said cylindrical wall portion further comprises a plurality of removable panel portions.

33. An insect trap according to claim 30 further comprising a chemical insect attractant layer deposited on said non-drying adhesive layer.

* * * * *